US010087768B2

(12) United States Patent
Burdgick et al.

(10) Patent No.: US 10,087,768 B2
(45) Date of Patent: Oct. 2, 2018

(54) STEAM TURBINE ROTOR SEAL KEY MEMBER, RELATED ASSEMBLY AND STEAM TURBINE

(71) Applicant: General Electric Company, Schenectady, NY (US)

(72) Inventors: Steven Sebastian Burdgick, Schenectady, NY (US); Sean Christopher Morrissey, Schenectady, NY (US); Nicholas Daniel Viscio, Voorheesville, NY (US)

(73) Assignee: General Electric Company, Schenectady, NY (US)

( * ) Notice: Subject to any disclaimer, the term of this patent is extended or adjusted under 35 U.S.C. 154(b) by 331 days.

(21) Appl. No.: 14/960,987

(22) Filed: Dec. 7, 2015

(65) Prior Publication Data
US 2017/0159474 A1     Jun. 8, 2017

(51) Int. Cl.
*F01D 11/00* (2006.01)
*F01D 5/02* (2006.01)
*F16B 3/04* (2006.01)
*F01D 11/02* (2006.01)

(52) U.S. Cl.
CPC .............. *F01D 11/005* (2013.01); *F01D 5/02* (2013.01); *F01D 11/001* (2013.01); *F01D 11/02* (2013.01); *F05D 2220/31* (2013.01); *F05D 2250/75* (2013.01); *F05D 2260/30* (2013.01); *F16B 3/04* (2013.01)

(58) Field of Classification Search
CPC ...... F01D 11/006; F01D 11/001; F01D 11/02; F01D 5/02; F01D 25/24; F16J 15/4472; F16J 15/3288; F16J 15/3292; F05D 2220/31; F05D 2260/30; F05D 2240/56; F05D 2240/59; F05D 2240/55; F16B 3/04
USPC ............. 416/204 A; 277/373, 372, 366, 367; 415/173.7
See application file for complete search history.

(56) References Cited

U.S. PATENT DOCUMENTS 3,096,074 A * 7/1963 Pratt .................... F01D 5/3015
                                                    416/215
4,304,523 A   12/1981 Corsmeier et al.
(Continued)

OTHER PUBLICATIONS

Extended European Search Report and Opinion issued in connection with corresponding EP Application No. 16201338.7 dated May 26, 2017.
(Continued)

*Primary Examiner* — Jason Shanske
*Assistant Examiner* — Topaz L Elliott
(74) *Attorney, Agent, or Firm* — Ernest G. Cusick; Hoffman Warnick LLC

(57) ABSTRACT

Various embodiments include a rotor key member, along with a related assembly and steam turbine. Particular embodiments include a rotor key member for retaining a circumferential seal in a steam turbine, the rotor key member including: a main body; a first arm extending from the main body; a second arm extending from the main body, wherein the first, arm, the second arm and the main body define a space spanning axially between the first arm and the second arm; and a hook extending from the second arm in a direction axially away from the space, the hook sized to contact a radially inner surface of the circumferential seal.

20 Claims, 8 Drawing Sheets

(56) References Cited

U.S. PATENT DOCUMENTS

| | | | |
|---|---|---|---|
| 4,846,628 A * | 7/1989 | Antonellis | F01D 5/3015 416/220 R |
| 5,236,302 A | 8/1993 | Weisgerber et al. | |
| 5,320,488 A | 6/1994 | Meade et al. | |
| 5,622,475 A * | 4/1997 | Hayner | F01D 5/3015 416/219 R |
| 6,106,234 A | 8/2000 | Gabbitas | |
| 7,371,050 B2 * | 5/2008 | Pasquiet | F01D 5/3015 416/204 A |
| 7,566,201 B2 | 7/2009 | Brillert et al. | |
| 8,105,041 B2 | 1/2012 | Brillert et al. | |
| 8,888,460 B2 | 11/2014 | Ahaus et al. | |
| 9,327,368 B2 | 5/2016 | Hagan | |
| 9,835,253 B2 | 12/2017 | Aksit | |
| 2005/0271511 A1 | 12/2005 | Pasquiet | |
| 2008/0181768 A1 | 7/2008 | Brucher et al. | |
| 2012/0251303 A1 | 10/2012 | Zheng et al. | |
| 2012/0288361 A1 | 11/2012 | Lu et al. | |
| 2017/0089215 A1 | 3/2017 | Zheng et al. | |

OTHER PUBLICATIONS

Xiaoging, Z., et al., Rotating brush seal with bristle shield, GE co-pending U.S. Appl. No. 15/237,692, filed Aug. 16, 2016.

U.S. Appl. No. 14/960,948, Office Action dated Feb. 8, 2018, 19 pages.

U.S. Appl. No. 14/960,975, Office Action dated Feb. 8, 2018, 18 pages.

U.S. Appl. No. 14/960,961, Office Action dated Feb. 9, 2018, 15 pages.

U.S. Appl. No. 14/960,975, Notice of Allowance dated May 22, 2018, 5 pages.

U.S. Appl. No. 14/960,948, Notice of Allowance dated Jun. 6, 2018, 16 pages.

U.S. Appl. No. 14/960,961, Notice of Allowance dated Jun. 13, 2018, 7 pages.

* cited by examiner

STEAM TURBINE ROTOR SEAL KEY MEMBER, RELATED ASSEMBLY AND STEAM TURBINE

BACKGROUND OF THE INVENTION

The subject matter disclosed herein relates to steam turbines. Specifically, the subject matter disclosed herein relates to seal devices in steam turbines.

Steam turbines include static nozzle assemblies that direct flow of a working fluid into turbine buckets connected to a rotating rotor. The nozzle construction (including a plurality of nozzles, or "airfoils") is sometimes referred to as a "diaphragm" or "nozzle assembly stage." Steam turbine diaphragms include two halves, which are assembled around the rotor, creating horizontal joints between these two halves. Each turbine diaphragm stage is vertically supported by support bars, support lugs or support screws on each side of the diaphragm at the respective horizontal joints. The horizontal joints of the diaphragm also correspond to horizontal joints of the turbine casing, which surrounds the steam turbine diaphragm.

Steam turbines utilize seals between rotor components and stator components, typically radially outward of the rotor bucket tip and radially inward of the diaphragm nozzle cover (stator). While some seals are formed as teeth on the rotor and/or stator, other configurations include a circumferential (or, rotating) seal that is located within a circumferential dovetail slot in the rotor. These rotating (circumferential) seals present unique design constraints, including, radial retention, rotation control, circumferential locking, and consistency of sealing across the circumference.

BRIEF DESCRIPTION OF THE INVENTION

Various embodiments include a rotor key member, along with a related assembly and steam turbine. Particular embodiments include a rotor key member for retaining a circumferential seal in a steam turbine, the rotor key member including: a main body; a first arm extending from the main; a second arm extending from the main body, wherein the first arm, the second arm and the main body define a space spanning axially between the first arm and the second arm; and a hook extending from the second arm in a direction axially away from the space, the hook sized to contact a radially inner surface of the circumferential seal.

A first aspect of the disclosure includes a rotor key member for retaining a circumferential seal in a steam turbine, the rotor key member including: a main body; a first arm extending from the main body; a second arm extending from the main body, wherein the first arm, the second arm and the main body define a space spanning axially between the first arm and the second arm; and a hook extending from the second arm in a direction axially away from the space, the hook sized to contact a radially inner surface of the circumferential seal.

A second aspect of the disclosure includes a steam turbine rotor assembly having: a rotor body having a slot extending substantially entirely circumferentially about a primary axis of the rotor body, the slot including: a primary slot extending substantially an entire circumferential distance about the rotor body; and a secondary slot extending axially from the primary slot and spanning only a portion of the circumferential distance about the rotor body; a circumferential seal within the primary slot spanning substantially the entire circumferential distance about the rotor body; a set of seal retaining members within the primary slot contacting an axial face of the circumferential seal; and a rotor key member within the secondary slot contacting the axial face of the circumferential seal, the rotor key member including a hook engaging a radially inner surface of the circumferential seal.

A third aspect of the disclosure includes a steam turbine having: a casing; and a rotor assembly at least partially contained within the casing, the rotor assembly having: a rotor body having a slot extending substantially entirely circumferentially about a primary axis of the rotor body, the slot including: a primary slot extending substantially an entire circumferential distance about the rotor body; and a secondary slot extending axially from the primary slot and spanning only a portion of the circumferential distance about the rotor body; a circumferential seal within the primary slot spanning substantially the entire circumferential distance about the rotor body; a set of seal retaining members within the primary slot contacting an axial face of the circumferential seal; and a rotor key member within the secondary slot contacting the axial face of the circumferential seal, the rotor key member including a hook engaging a radially inner surface of the circumferential seal.

BRIEF DESCRIPTION OF THE DRAWINGS

These and other features of this invention will be more readily understood from the following detailed description of the various aspects of the invention taken in conjunction with the accompanying drawings that depict various embodiments of the disclosure, in which.

Figure 1:
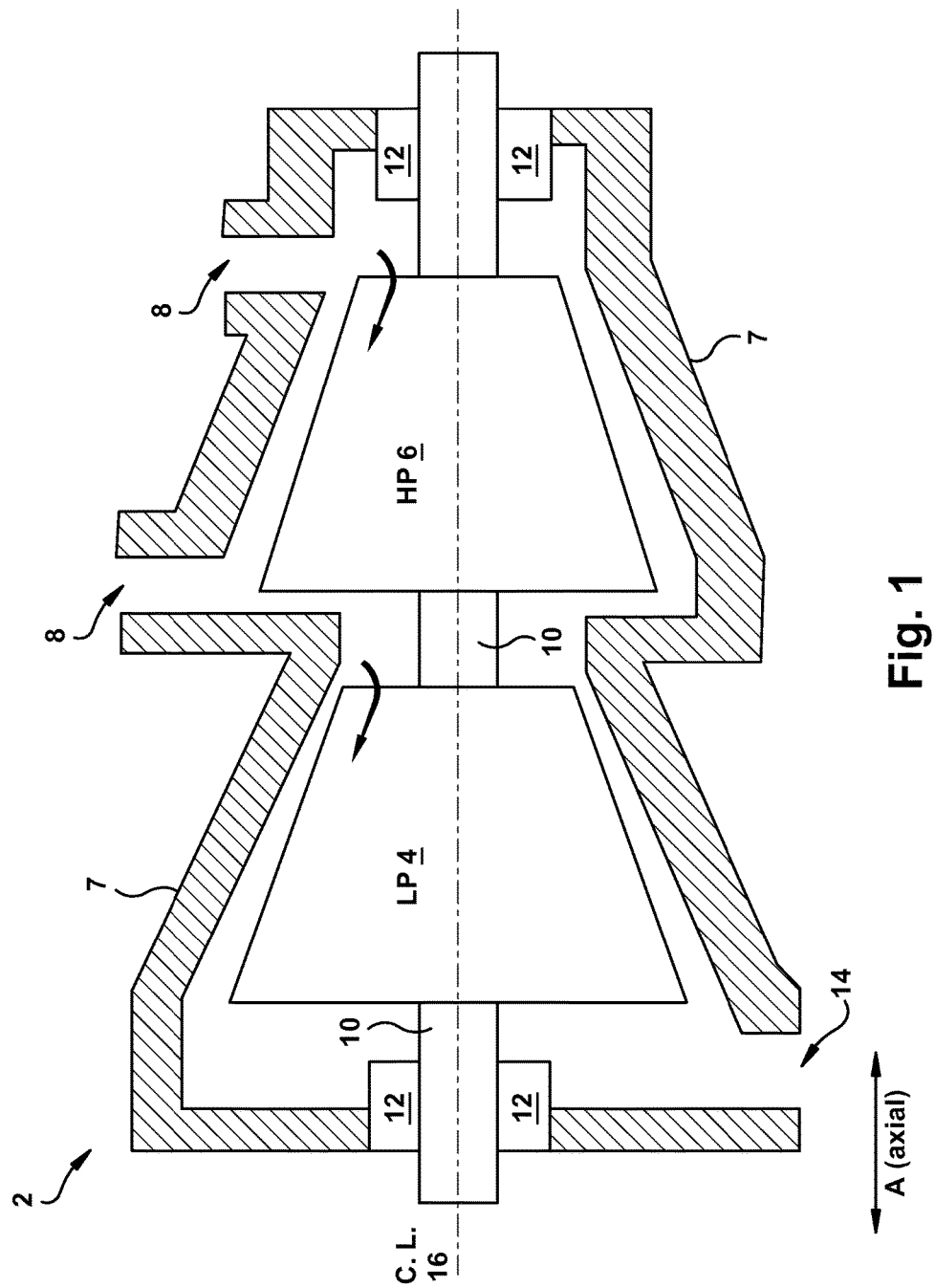
FIG. 1 shows a partial cross-sectional schematic view of steam turbine according to various embodiments.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

The subject matter disclosed herein relates to steam turbines. Specifically, the subject matter disclosed herein relates to rotating seals in steam turbines.

According to various embodiments of the disclosure, a device (e.g., key member) is configured to lock/unlock a circumferential (rotatable) seal in a steam turbine, both radially retaining that seal as well as preventing rotation. Conventional approaches to retain circumferential seals allow for unwanted rotation, and are also susceptible to slipping and creep, which can both diminish the effectiveness of the seal and wear on the seal and adjacent components. In contrast to these conventional approaches, various embodiments include a key member sized to engage a key slot within the rotor body between circumferentially disposed seal retaining members, and retain an adjacent rotating seal. The key member can include an axially extending hook sized to engage a radially inner surface of the rotating seal. The key member has a sufficient axial width to contact both the rotating seal and the axially facing wall of the key slot. The key member can be formed of a deformable material, and in some cases, can include an interior cavity to aid in deformation of the key member during installation and/or removal. In some cases, the key member includes additional apertures (extending through the wall sharing the axially extending hook, or through the opposing wall) for weight reduction.

As denoted in these Figures, the "A" axis represents axial orientation (along the axis of the turbine rotor, sometimes referred to as the turbine centerline, omitted for clarity). As used herein, the terms "axial" and/or "axially" refer to the relative position/direction of objects along axis A, which is substantially parallel with the axis of rotation of the turbomachine (in particular, the rotor section). As further used herein, the terms "radial" and/or "radially" refer to the relative position/direction of objects along axis (r), which is substantially perpendicular with axis A and intersects axis A at only one location. Additionally, the terms "circumferential" and/or "circumferentially" refer to the relative position/direction of objects along a circumference (c) which surrounds axis A but does not intersect the axis A at any location. Identically labeled elements in the Figures depict substantially similar (e.g., identical) components.

Turning to FIG. 1, a partial cross-sectional schematic view of steam turbine 2 (e.g., a high-pressure/intermediate-pressure steam turbine) is shown. Steam turbine 2 may include, for example, a low pressure (LP) section 4 and a high pressure (HP) section 6 (it is understood that either LP section 4 or HP section 6 can include an intermediate pressure (IP) section, as is known in the art). The LP section 4 and HP section 6 are at least partially encased in casing 7. Steam may enter the HP section 6 and LP section 4 via one or more inlets 8 in casing 7, and flow axially downstream from the inlet(s) 8. In some embodiments, HP section 6 and LP section 4 are joined by a common shaft 10, which may contact bearings 12, allowing for rotation of the shaft 10, as working fluid (steam) forces rotation of the blades within each of LP section 4 and HP section 6. After performing mechanical work on the blades within LP section 4 and HP section 6, working fluid (e.g., steam) may exit through outlet 14 in casing 7. The center line (CL) 16 of HP section 6 and LP section 4 is shown as a reference point. Both LP section 4 and HP section 6 can include diaphragm assemblies, which are contained within segments of casing 7.

Figure 2:
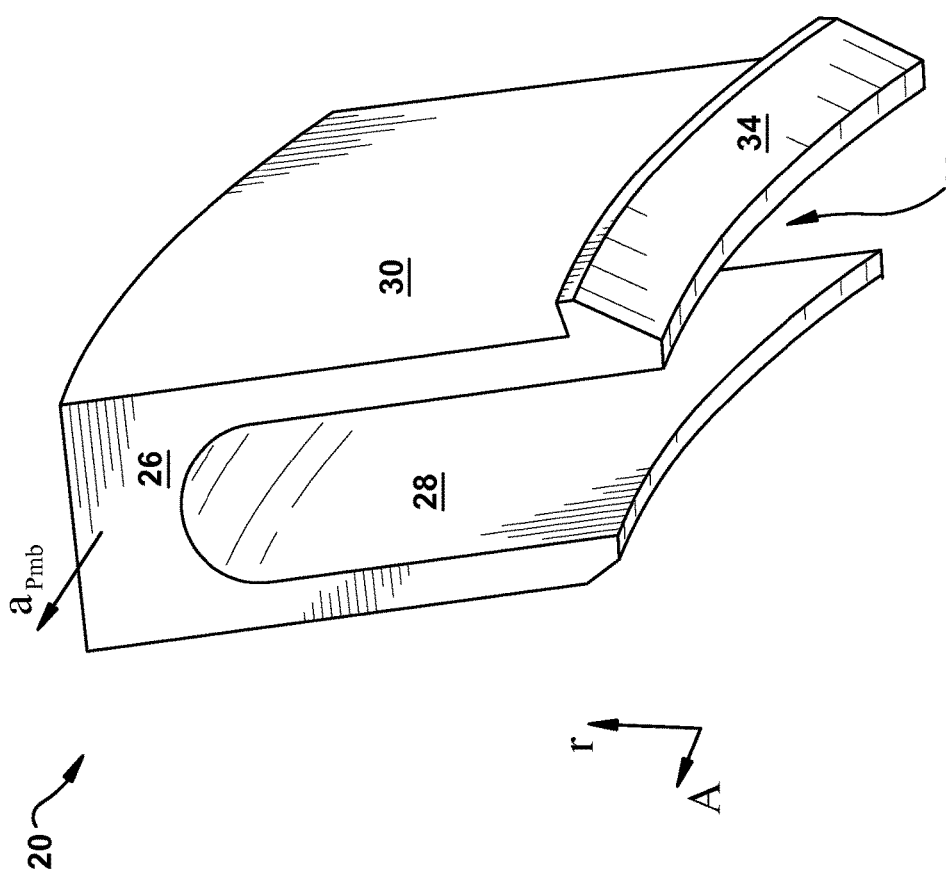
FIG. 2 shows a schematic three-dimensional perspective view of a rotor key member according to various embodiments of the disclosure.
Figure 3:
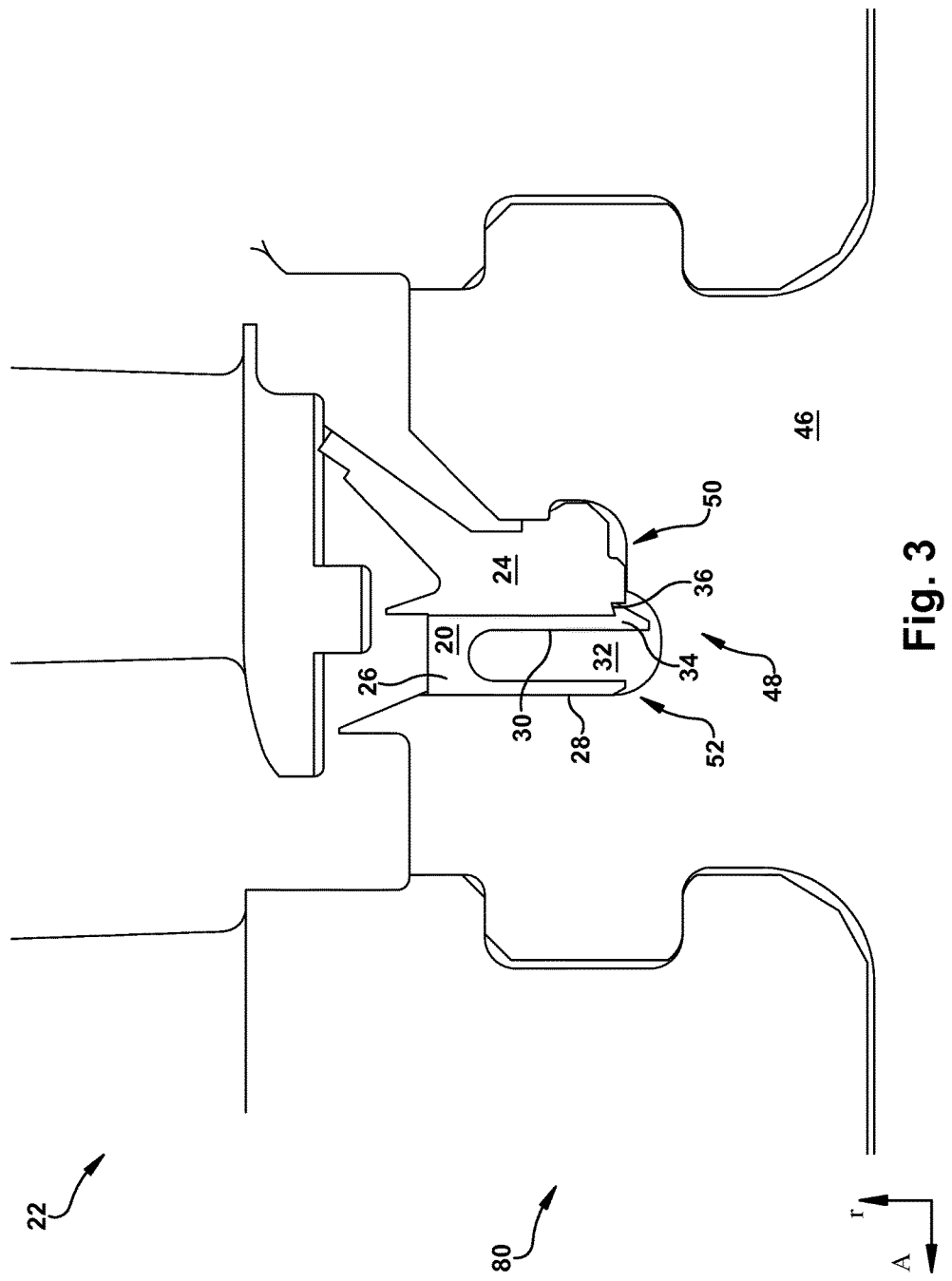
FIG. 3 shows a schematic cut-away view of a steam turbine rotor assembly according to various embodiments of the disclosure.

FIG. 2 shows a schematic three-dimensional perspective view of a rotor key member 20 according to various embodiments. FIG. 3, which is referred to simultaneously with FIG. 2, shows a schematic cut-away view of a steam turbine rotor assembly 22 according to various embodiments. As shown in FIG. 3, rotor key member 20 is configured to retain a circumferential seal 24 in a steam turbine (e.g., in a rotor assembly 22 within a steam turbine, such as steam turbine 2). It is understood that the rotor assembly 22 (including circumferential seal 24) can be a component within an HP, IP and/or LP section of a steam turbine (e.g., HP 6, LP 4, etc. section of steam turbine 2). Rotor key member 20 can include: a main body 26, a first arm 28 extending from the main body 26 (e.g., in some cases, in a direction (aligned with radial direction (r), in steam turbine 2) substantially perpendicular with a primary axis ($a_{P_{mb}}$) of main body 26 (FIG. 2)), and a second arm 30 extending from main body 26 (e.g., in some cases, substantially parallel (e.g., parallel within an acceptable margin of deviation, such as 1-3% deviation) with first arm 28). In various embodiments, first arm 28, second arm 30 and main body 26 define a space 32 spanning axially between first arm 28 and second arm 30. Rotor key member 20 can also include a hook 34 extending from second arm 30 in a direction axially away from space 32, where hook 34 is sized to contact a radially inner surface 36 of circumferential seal 24 (FIG. 3).

According to various embodiments, as shown in FIG. 2, the first arm 28, second arm 30 and main body 26 can collectively form a U-shaped member (when viewed from a direction facing the primary axis ($a_{P_{mb}}$) of main body 26. In some cases, main body 26, first arm 28, second arm 30 and hook 34 are substantially unitary, and are formed of a common material. In these cases, rotor key member 20 can be made of a single piece of material, e.g., forged, cast, molded or otherwise formed from a common material. In particular cases, the common material includes a material that can capable of deflection while being inserted/removed from a space within rotor assembly 22, but is also strong enough to withstand radial and circumferential loading from circumferential seal 24 (thereby retaining seal 24 circumferentially and radially). This material could include a steel, for example, including approximately 2.5 percent to approximately 12 percent chrome (e.g., INCO 615 or INCO 718). According to various embodiments, the common material used to form rotor key member 20 makes the rotor key member 20 flexible in response to force. That is, in response to compressive force on at least one of first arm 28 or second arm 30, a size of space 32 between these two arms 28, 30 is reduced (and returned upon removal of that compressive force). In some cases, as seen in FIG. 2, the thickness of main body 26 as measured axially (in direction A, perpendicular to primary axis ($a_{P_{mb}}$) of main body 26) is greater than a combined axial thickness of first arm 28 and second arm 30. It is further understood that the material composition of rotor key member 20 can make rotor key member 20 flexible in a plurality of directions. For example, rotor key member 20 may also respond to compressive force applied at any number of points on first arm 28, second arm 30 and/or main body 26, such that rotor key member 20 could be compressed in a direction coinciding with the primary axis ($a_{P_{mb}}$) of the main body 26 (matching the circumferential direction about the rotor assembly 22). That is, in some cases, a compressive force may be applied to the main body along the primary axis ($a_{P_{mb}}$) in order to insert/remove rotor key member from a location within rotor assembly 22.

Figure 4:
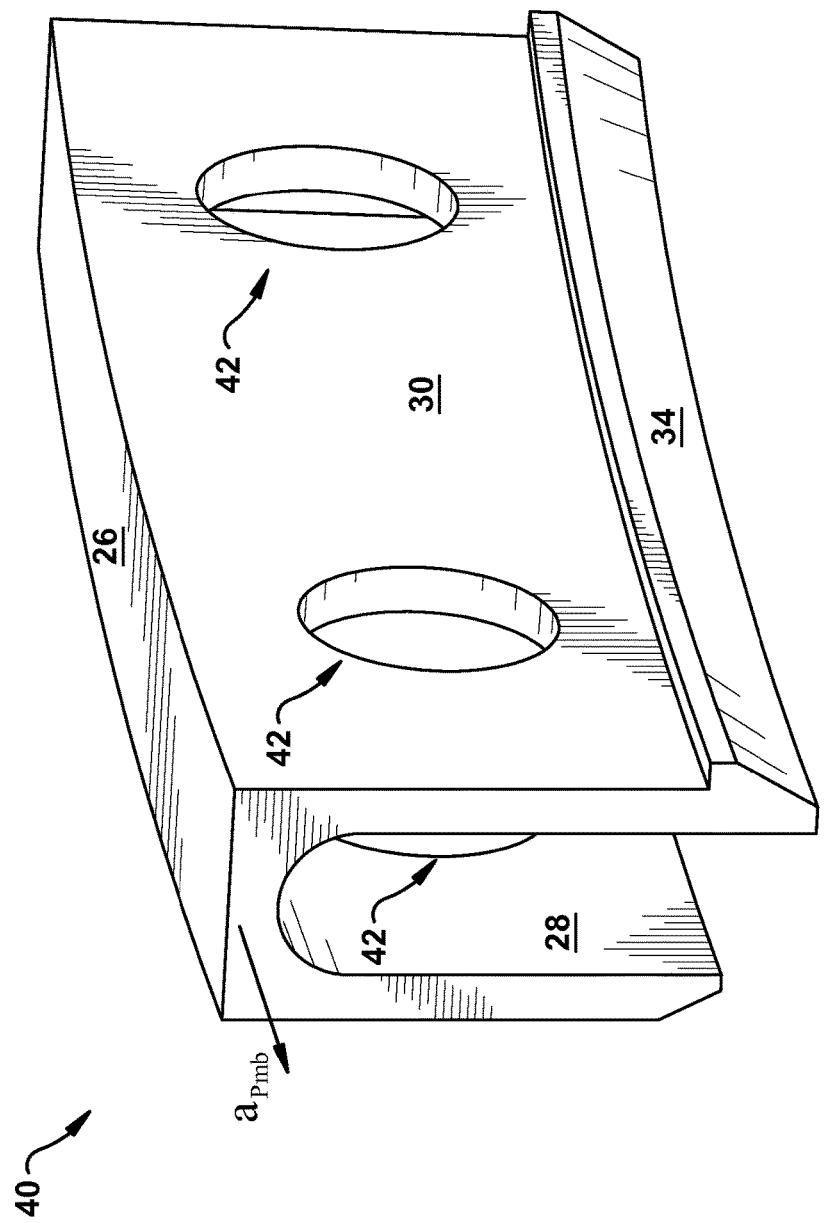
FIG. 4 shows a schematic three-dimensional perspective view of a rotor key member according to various embodiments of the disclosure.

In some embodiments, as shown in the schematic three-dimensional perspective view of a rotor key member 40 in FIG. 4, rotor key member 40 can include one or more apertures 42 extending axially through at least one of first arm 28 or second arm 30. In various embodiments, these apertures 42 can reduce the weight of rotor key member 40 relative to rotor key member 20, making rotor key member 40 easier to manipulate (e.g., insert/remove from portion of steam turbine 2).

Figure 5:
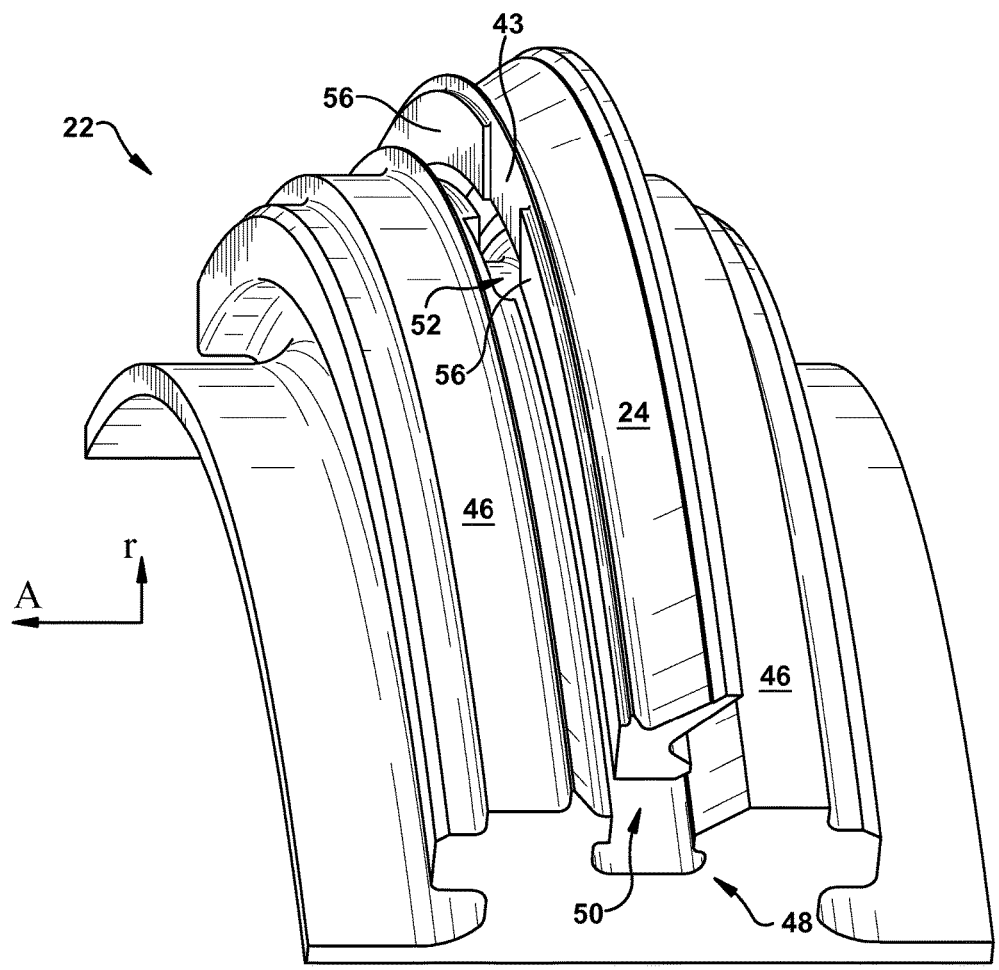
FIG. 5 shows a schematic three-dimensional perspective view of the rotor assembly of FIG. 3, excluding the rotor key member, according to various embodiments of the disclosure.
Figure 6:
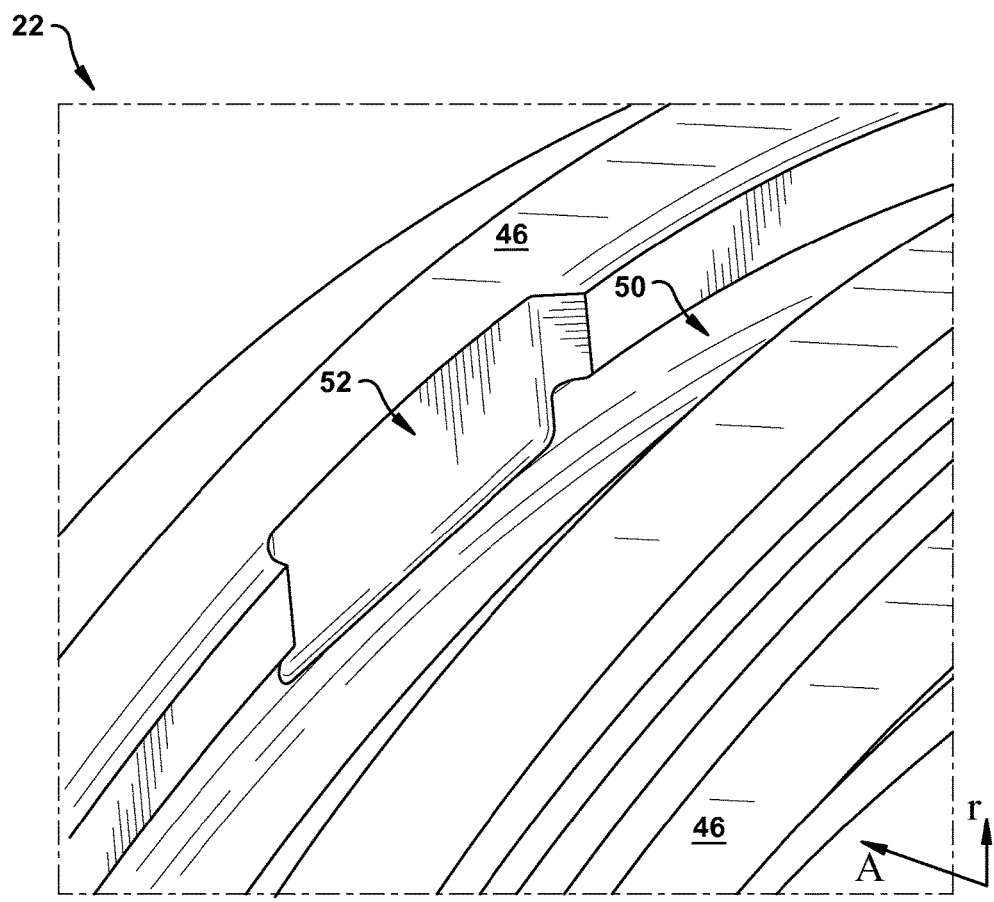
FIG. 6 shows a three-dimensional perspective view of a portion of the rotor assembly of FIG. 3, excluding the circumferential seal and rotor key member, according to various embodiments of the disclosure.
Figure 7:
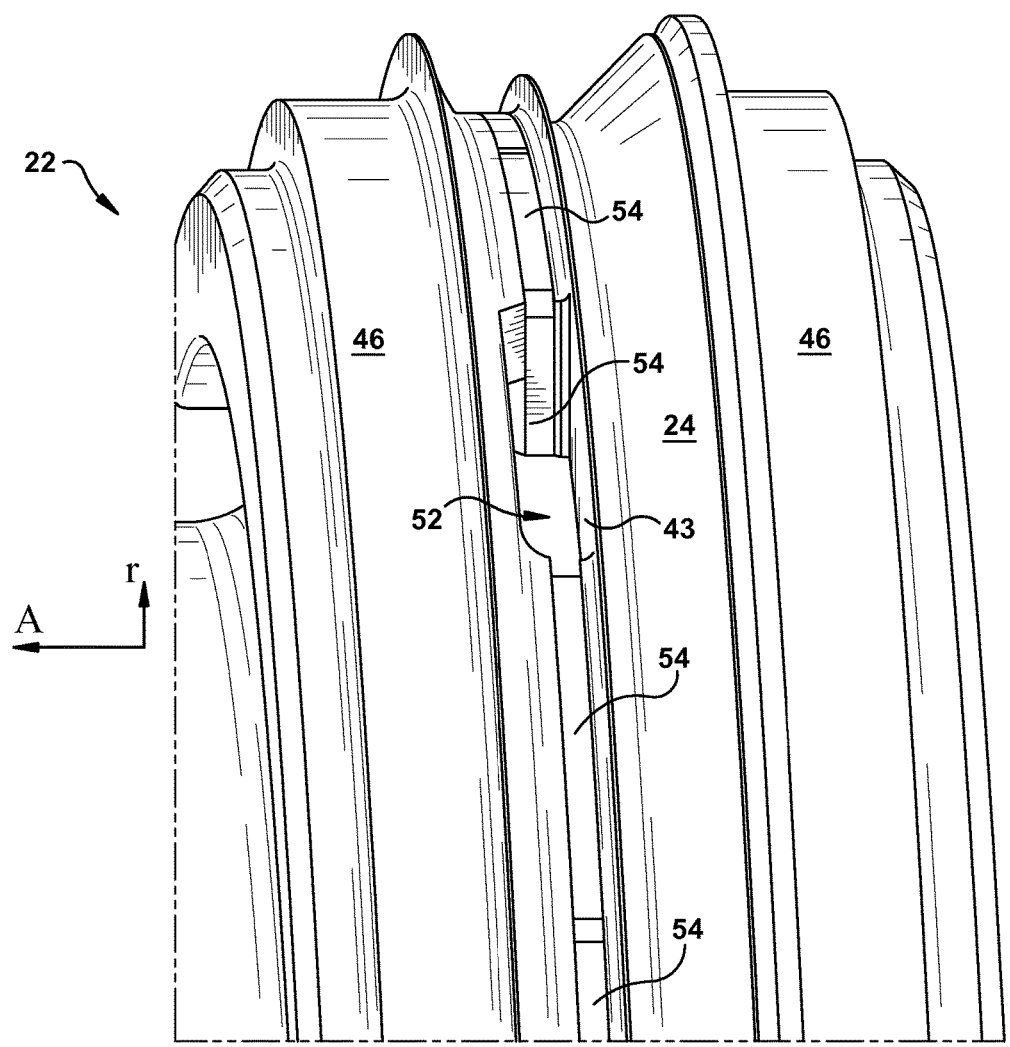
FIG. 7 shows a three-dimensional perspective view of a portion of the rotor assembly of FIG. 3, excluding the rotor key member, but further including a seal retaining member, according to various embodiments of the disclosure.
Figure 8:
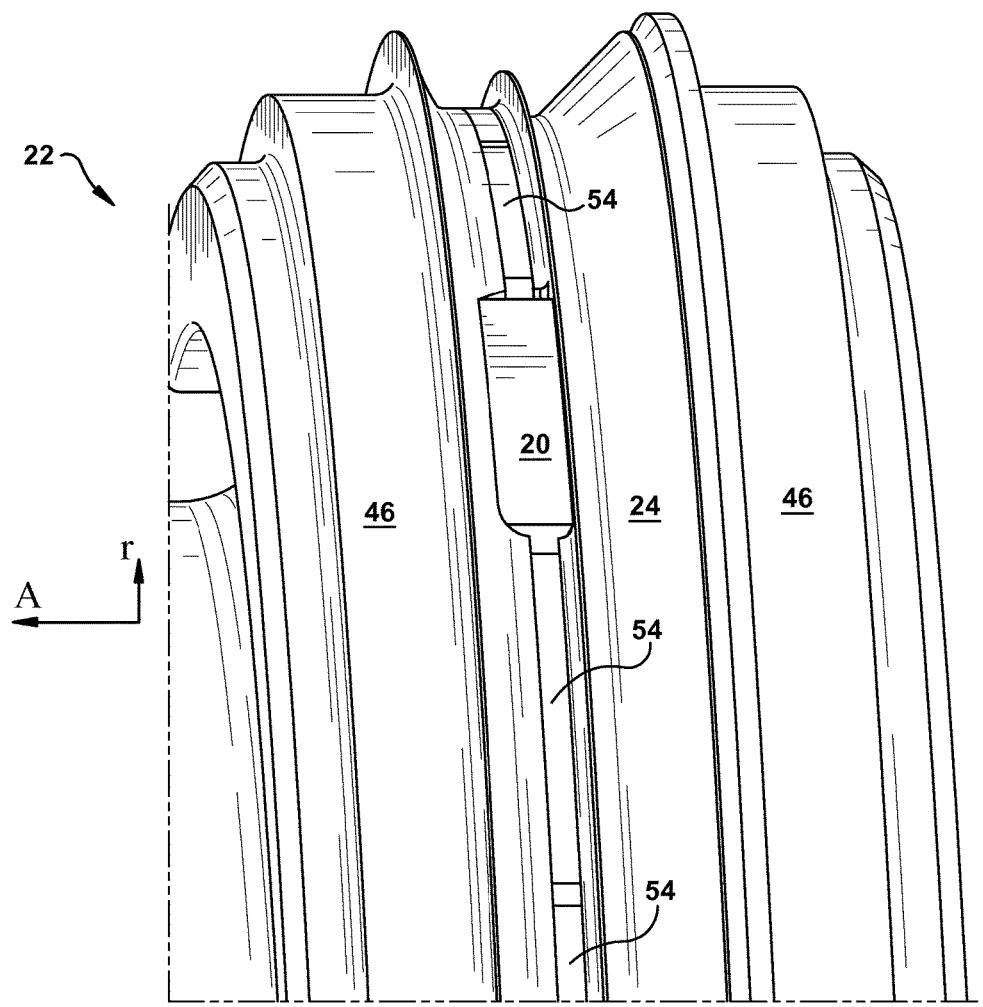
FIG. 8 shows a three-dimensional perspective view of a rotor assembly according to various embodiments of the disclosure.

FIG. 5 shows a schematic three-dimensional perspective view of the rotor assembly 22 of FIG. 3, excluding rotor key member 20. FIG. 6 shows a three-dimensional perspective view of a portion of rotor assembly 22, excluding circumferential seal 24 and rotor key member 20. FIG. 7 shows a three-dimensional perspective view of a portion of rotor assembly 22, excluding rotor key member 20, but further including seal retaining members 54, as described herein. FIG. 8 shows the rotor assembly 22, including circumferential seal 24, seal retaining members 44 and rotor key member 20.

Returning to FIG. 3, but with continuing reference to FIGS. 5-8, rotor assembly 22 is shown including a rotor body 46 having a slot 48 extending substantially entirely circumferentially about a primary axis (A) of the rotor body 46 (primary axis A corresponding with axis of rotation of steam turbine). Slot 48 can include a primary slot 50 extending substantially an entire circumferential distance about rotor body 46, and a secondary slot 52 (FIGS. 5, 6 and 7) extending axially from primary slot 50 and spanning only a portion of the circumferential distance about rotor body 46. As shown in FIG. 3, rotor assembly 22 can further include circumferential seal 24 within primary slot 50, spanning substantially the entire circumferential distance about rotor body 46 (e.g., in sections or as one continuous piece of material). FIGS. 7 and 8 illustrate additional components in rotor assembly 22, including a set of seal retaining members 54 (e.g., a plurality, circumferentially disposed) within primary slot 50 contacting an axial face 56 of circumferential seal 24. As shown in FIG. 8, rotor key member 20 is located within (and substantially fills) secondary slot 52, and contacts axial face 56 of circumferential seal 24. Rotor key member 20 may be sized to slide into or out of secondary slot 52 to lock circumferential seal 24, e.g., using among other things, hook 34 to engage radially inner surface 36 of circumferential seal 24. As described herein, the U-shaped feature of rotor key member 20, along with its flexible composition, can allow the rotor key member 20 to be inserted/removed from secondary slot 52 in order to lock/unlock seal retaining members 54 (and in turn, circumferential seal 24). As shown in FIG. 5 and FIG. 7, in some embodiments, circumferential seal 24 can include a recess 43 extending only partially circumferentially, marking a break between adjacent segments of axial face 56. In some cases, this recess 43 can be sized to accommodate rotor key member 20, and coincide with secondary slot 52.

During operation of steam turbine 2, rotor assembly 22 can retain circumferential seal 24 by placing axial pressure on axial face 56. In particular, seal retaining members 54 can place axial pressure on circumferential seal (at axial face 56), while rotor key member 20 locks seal retaining members 54 circumferentially in place (where first arm 28 is retained by secondary slot 52). Additionally, rotor key member 20 engages the axial face of circumferential seal 24 within recess 43, restricting circumferential rotation of circumferential seal 24 relative to rotor body 46. Even further, hook 34 engages radially inner surface of circumferential seal 24, to restrict axial rotation of that circumferential seal 24 relative to rotor body 46. It is understood that according to various embodiments, rotor key member 20 (and rotor assembly 22) can be utilized in a plurality of stages within a steam turbine (e.g., steam turbine 2), and can aid in both assembly/disassembly of circumferential seal components, as well as reduce wear and complications from component failure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A rotor key member for retaining a circumferential seal in a steam turbine, the rotor key member comprising:
   a main body;
   a first arm extending from the main body;
   a second arm extending from the main body,
   wherein the first arm, the second arm and the main body define a space spanning axially between the first arm and the second arm; and
   a hook extending from the second arm in a direction axially away from the space, the hook sized to contact a radially inner surface of the circumferential seal,
   wherein, in response to compressive force on at least one of the first arm or the second arm, a size of the space between the first arm and the second arm is reduced.

2. The rotor key member of claim 1, wherein the first arm extends from the main body in a direction substantially perpendicular with a primary axis of the main body, the direction aligned with a radial direction in the steam turbine, wherein the second arm is substantially parallel with the first arm.

3. The rotor key member of claim 1, wherein at least one of the first arm or the second arm includes a set of apertures extending axially therethrough.

4. The rotor key member of claim 1, wherein the first arm, the second arm and the main body collectively form a substantially U-shaped member.

5. The rotor key member of claim 1, wherein the main body, the first arm, the second arm and the hook are unitary and formed of a common material.

6. The rotor key member of claim 5, wherein the common material includes steel.

7. The rotor key member of claim 1, wherein the reduction in the size of the space between the first arm and the second arm permits radial insertion and removal from the steam turbine to retain the circumferential seal.

8. The rotor key member of claim 7, wherein when retaining the circumferential seal in the steam turbine, the hook is sized to engage a radially inner surface of the circumferential seal.

9. A steam turbine rotor assembly comprising:
   a rotor body having a slot extending substantially entirely circumferentially about a primary axis of the rotor body, the slot including:
   a primary slot extending substantially an entire circumferential distance about the rotor body; and a secondary slot extending axially from the primary slot and spanning only a portion of the circumferential distance about the rotor body;

a circumferential seal within the primary slot spanning substantially the entire circumferential distance about the rotor body;

a set of seal retaining members within the primary slot contacting an axial face of the circumferential seal; and a rotor key member within the secondary slot contacting the axial face of the circumferential seal, the rotor key member including a hook engaging a radially inner surface of the circumferential seal, wherein the rotor key member further includes:

a main body;

a first arm extending from the main body in a direction substantially perpendicular with a primary axis of the main body;

a second arm extending from the main body, the second arm being substantially parallel with the first arm, wherein the first arm, the second arm and the main body define a space spanning axially between the first arm and the second arm, wherein the hook extends from the second arm in a direction axially away from the space.

10. The steam turbine rotor assembly of claim 9, wherein at least one of the first arm or the second arm includes a set of apertures extending axially therethrough.

11. The steam turbine rotor assembly of claim 9, wherein the first arm, the second arm and the main body collectively form a U-shaped member.

12. The steam turbine rotor assembly of claim 9, wherein a thickness of the main body as measured axially is greater than a combined thickness of the first arm and the second arm as measured axially.

13. The steam turbine rotor assembly of claim 9, wherein the main body, the first arm, the second arm and the hook are unitary and formed of a common material.

14. The steam turbine rotor assembly of claim 13, wherein the common material includes steel, wherein, in response to compressive force on at least one of the first arm or the second arm, a size of the space between the first arm and the second arm is reduced thereby allowing for at least one of installation or removal of the rotor key member with respect to the secondary slot.

15. A steam turbine comprising:

a casing; and a rotor assembly at least partially contained within the casing, the rotor assembly having:

a rotor body having a slot extending substantially entirely circumferentially about a primary axis of the rotor body, the slot including:

a primary slot extending substantially an entire circumferential distance about the rotor body; and a secondary slot extending axially from the primary slot and spanning only a portion of the circumferential distance about the rotor body;

a circumferential seal within the primary slot spanning substantially the entire circumferential distance about the rotor body;

a set of seal retaining members within the primary slot contacting an axial face of the circumferential seal; and a rotor key member within the secondary slot contacting the axial face of the circumferential seal, the rotor key member including a hook engaging a radially inner surface of the circumferential seal, wherein the rotor key member further includes:

a main body;

a first arm extending from the main body in a direction substantially perpendicular with a primary axis of the main body;

a second arm extending from the main body, the second arm being substantially parallel with the first arm, wherein the first arm, the second arm and the main body define a space spanning axially between the first arm and the second arm, wherein the hook extends from the second arm in a direction axially away from the space.

16. The steam turbine of claim 15, wherein at least one of the first arm or the second arm includes a set of apertures extending axially therethrough.

17. The steam turbine of claim 15, wherein the first arm, the second arm and the main body collectively form a U-shaped member.

18. The steam turbine of claim 15, wherein a thickness of the main body as measured axially is greater than a combined thickness of the first arm and the second arm as measured axially.

19. The steam turbine of claim 15, wherein the main body, the first arm, the second arm and the hook are substantially unitary and formed of a common material.

20. The steam turbine of claim 19, wherein the common material includes steel, wherein, in response to compressive force on at least one of the first arm or the second arm, a size of the space between the first arm and the second arm is reduced thereby allowing for at least one of installation or removal of the rotor key member with respect to the secondary slot.

* * * * *